(12) United States Patent
Matsuo et al.

(10) Patent No.: US 10,565,010 B2
(45) Date of Patent: Feb. 18, 2020

(54) LADDER PROGRAM ANALYZING DEVICE

(71) Applicant: FANUC CORPORATION, Yamanashi (JP)

(72) Inventors: Toshiyuki Matsuo, Yamanashi (JP); Mitsuru Mochizuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 246 days.

(21) Appl. No.: 15/598,714

(22) Filed: May 18, 2017

(65) Prior Publication Data
US 2017/0337082 A1 Nov. 23, 2017

(30) Foreign Application Priority Data

May 19, 2016 (JP) .................................. 2016-100578

(51) Int. Cl.
*G06F 9/48* (2006.01)
(52) U.S. Cl.
CPC ................... *G06F 9/4881* (2013.01)
(58) Field of Classification Search
CPC combination set(s) only.
See application file for complete search history.

(56) References Cited

U.S. PATENT DOCUMENTS 9,477,578 B2 * 10/2016 Yamaoka ............... G05B 19/05
10,295,981 B2 * 5/2019 Yamaoka ........... G05B 19/0426
2002/0059567 A1 * 5/2002 Minamide ................. G06F 8/51
717/151
2005/0033457 A1 * 2/2005 Yamane ............... G05B 19/056
700/18
2006/0155889 A1 * 7/2006 Furushima ............. G05B 19/05
710/8

(Continued)

FOREIGN PATENT DOCUMENTS

CN 104160344 A 11/2014
JP S61-143809 A 7/1986

(Continued)

OTHER PUBLICATIONS

Notice of Allowance in JP Application No. 2016-100578, dated May 22, 2018, 6pp.

(Continued)

*Primary Examiner* — Nha T Nguyen
(74) *Attorney, Agent, or Firm* — Hauptman Ham, LLP

(57) ABSTRACT

A ladder program analyzing device that can present information for improving execution efficiency of a ladder program includes a ladder program analyzing unit and a ladder program analysis result displaying unit. The ladder program analyzing unit analyzes a ladder program including a plurality of ladder circuits and prepares an execution priority signal table in which execution priorities of the ladder circuits, reference signals indicating signals input to the ladder circuits, and update signals indicating signals output from the ladder circuits are correlated with each other. The ladder program analysis result displaying unit determines presence or absence of the ladder circuit improvable in execution efficiency by comparing the execution priorities, the reference signals, and the update signals of two of the ladder circuits on the basis of the execution priority signal table and displays the determination result.

5 Claims, 19 Drawing Sheets

(56) References Cited

U.S. PATENT DOCUMENTS

| | | | | |
|---|---|---|---|---|
| 2009/0276059 A1* | 11/2009 | Tone | | G05B 19/052 700/7 |
| 2011/0302393 A1* | 12/2011 | Matsumoto | | G06F 9/3017 712/221 |
| 2012/0072777 A1* | 3/2012 | Nonomura | | G05B 19/056 714/38.1 |
| 2014/0304551 A1* | 10/2014 | Nakai | | G06F 11/3692 714/38.1 |
| 2015/0301923 A1* | 10/2015 | Yamaoka | | G05B 19/05 714/38.1 |
| 2016/0004242 A1* | 1/2016 | Yamaoka | | G05B 19/056 700/87 |
| 2016/0091883 A1* | 3/2016 | Fujiwara | | G05B 19/058 700/3 |
| 2016/0125037 A1* | 5/2016 | Iwamura | | G06F 16/24575 707/722 |
| 2016/0179904 A1* | 6/2016 | Mochizuki | | H03K 19/17764 707/722 |
| 2016/0187865 A1* | 6/2016 | Tsuji | | G05B 19/054 700/83 |
| 2016/0267001 A1* | 9/2016 | Yonekura | | G05B 19/056 |
| 2017/0068229 A1* | 3/2017 | Yaoita | | G06F 11/32 |
| 2017/0075334 A1* | 3/2017 | Yaoita | | G05B 19/05 |
| 2017/0277157 A1* | 9/2017 | Yamaoka | | G05B 19/056 |
| 2017/0315544 A1* | 11/2017 | Tateno | | G05B 19/05 |

FOREIGN PATENT DOCUMENTS

| | | |
|---|---|---|
| JP | H05189012 A | 7/1993 |
| JP | H11-110010 A | 4/1999 |
| JP | 2005063425 A | 3/2005 |
| JP | 3666507 B2 | 6/2005 |
| JP | 2007-272679 A | 10/2007 |
| JP | 2008020956 A | 1/2008 |
| JP | 4494361 B2 | 6/2010 |
| JP | 4922684 B2 | 4/2012 |

OTHER PUBLICATIONS

Office Action in CN Application No. 201710353195.1, dated Jan. 31, 2019, 12pp.

* cited by examiner

FIG.4

EXECUTION PRIORITY SIGNAL TABLE

| EXECUTION PRIORITY | POSITION INFORMATION | | REFERENCE SIGNAL | UPDATE SIGNAL |
|---|---|---|---|---|
| | PROGRAM | NET POSITION | | |
| 1 | MAIN | 1 | A | X |
| 2 | MAIN | 2 | H | - |
| 3 | P1 | 1 | C | A |
| 4 | P1 | 2 | Z | D |
| 5 | MAIN | 3 | D | Y |
| 6 | MAIN | 4 | X | - |
| 7 | P2 | 1 | Y | C |
| 8 | P2 | 2 | C | E |
| 9 | MAIN | 5 | I | B |

EXECUTION PRIORITY SIGNAL TABLE

| EXECUTION PRIORITY | POSITION INFORMATION | | REFERENCE SIGNAL | UPDATE SIGNAL |
|---|---|---|---|---|
| | PROGRAM | NET POSITION | | |
| 1 | MAIN | 1 | A | X |
| 2 | MAIN | 2 | H | - |
| 3 | P1 | 1 | C | A |
| 4 | P1 | 2 | Z | D |
| 5 | MAIN | 3 | D | Y |
| 6 | MAIN | 4 | X | - |
| 7 | P2 | 1 | Y | C |
| 8 | P2 | 2 | C | E |
| 9 | MAIN | 5 | I | B |

EXECUTION PRIORITY SIGNAL TABLE

| EXECUTION PRIORITY | POSITION INFORMATION | REFERENCE SIGNAL | UPDATE SIGNAL |
|---|---|---|---|
| 1 | 1 | X | A |
| 2 | 2 | Y,C | B |
| 3 | 3 | D | C |
| 4 | 4 | Z,A | D |
| 5 | 5 | B,A | E,F |

EXECUTION PRIORITY SIGNAL TABLE

| EXECUTION PRIORITY | POSITION INFORMATION | REFERENCE SIGNAL | UPDATE SIGNAL |
|---|---|---|---|
| 1 | 1 | (X) | A |
| 2 | 2 | (Y)C | B |
| 3 | 3 | D | C |
| 4 | 4 | (Z)A | D |
| 5 | 5 | B,A | E,F |

FIG.10

EXECUTION PRIORITY SIGNAL TABLE

| EXECUTION PRIORITY | POSITION INFORMATION | REFERENCE SIGNAL | UPDATE SIGNAL |
|---|---|---|---|
| 1 | 1 | - | A |
| 2 | 2 | C | B |
| 3 | 3 | D | C |
| 4 | 4 | A | D |
| 5 | 5 | B,A | E,F |

EXECUTION PRIORITY TABLE

| EXECUTION PRIORITY | POSITION INFORMATION |
|---|---|
| 1 | 1 |
| 2 | |
| 3 | |
| 4 | |
| 5 | |

FIG.11

EXECUTION PRIORITY SIGNAL TABLE

| EXECUTION PRIORITY | POSITION INFORMATION | REFERENCE SIGNAL | UPDATE SIGNAL |
|---|---|---|---|
| 1 | 1 | - | A |
| 2 | 2 | C | B |
| 3 | 3 | D | C |
| 4 | 4 | (A) | D |
| 5 | 5 | B,(A) | E,F |

EXECUTION PRIORITY TABLE

| EXECUTION PRIORITY | POSITION INFORMATION |
|---|---|
| 1 | 1 |
| 2 | |
| 3 | |
| 4 | |
| 5 | |

FIG.12

EXECUTION PRIORITY SIGNAL TABLE

| EXECUTION PRIORITY | POSITION INFORMATION | REFERENCE SIGNAL | UPDATE SIGNAL |
|---|---|---|---|
| 1 | 1 | - | A |
| 2 | 2 | C | B |
| 3 | 3 | D | C |
| 4 | 4 | - | D |
| 5 | 5 | B | E,F |

EXECUTION PRIORITY TABLE

| EXECUTION PRIORITY | POSITION INFORMATION |
|---|---|
| 1 | 1 |
| 2 | |
| 3 | |
| 4 | |
| 5 | |

FIG.13

EXECUTION PRIORITY SIGNAL TABLE

| EXECUTION PRIORITY | POSITION INFORMATION | REFERENCE SIGNAL | UPDATE SIGNAL |
|---|---|---|---|
| 1 | | | |
| 2 | 2 | C | B |
| 3 | 3 | D | C |
| 4 | 4 | - | D |
| 5 | 5 | B | E,F |

EXECUTION PRIORITY TABLE

| EXECUTION PRIORITY | POSITION INFORMATION |
|---|---|
| 1 | 1 |
| 2 | |
| 3 | |
| 4 | |
| 5 | |

FIG.14

EXECUTION PRIORITY SIGNAL TABLE

| EXECUTION PRIORITY | POSITION INFORMATION | REFERENCE SIGNAL | UPDATE SIGNAL |
|---|---|---|---|
| 1 | | | |
| 2 | 2 | C | B |
| 3 | 3 | - | C |
| 4 | | | |
| 5 | 5 | B | E,F |

EXECUTION PRIORITY TABLE

| EXECUTION PRIORITY | POSITION INFORMATION |
|---|---|
| 1 | 1 |
| 2 | 4 |
| 3 | |
| 4 | |
| 5 | |

FIG.15

EXECUTION PRIORITY SIGNAL TABLE

| EXECUTION PRIORITY | POSITION INFORMATION | REFERENCE SIGNAL | UPDATE SIGNAL |
|---|---|---|---|
| 1 | | | |
| 2 | 2 | - | B |
| 3 | | | |
| 4 | | | |
| 5 | 5 | B | E,F |

EXECUTION PRIORITY TABLE

| EXECUTION PRIORITY | POSITION INFORMATION |
|---|---|
| 1 | 1 |
| 2 | 4 |
| 3 | 3 |
| 4 | |
| 5 | |

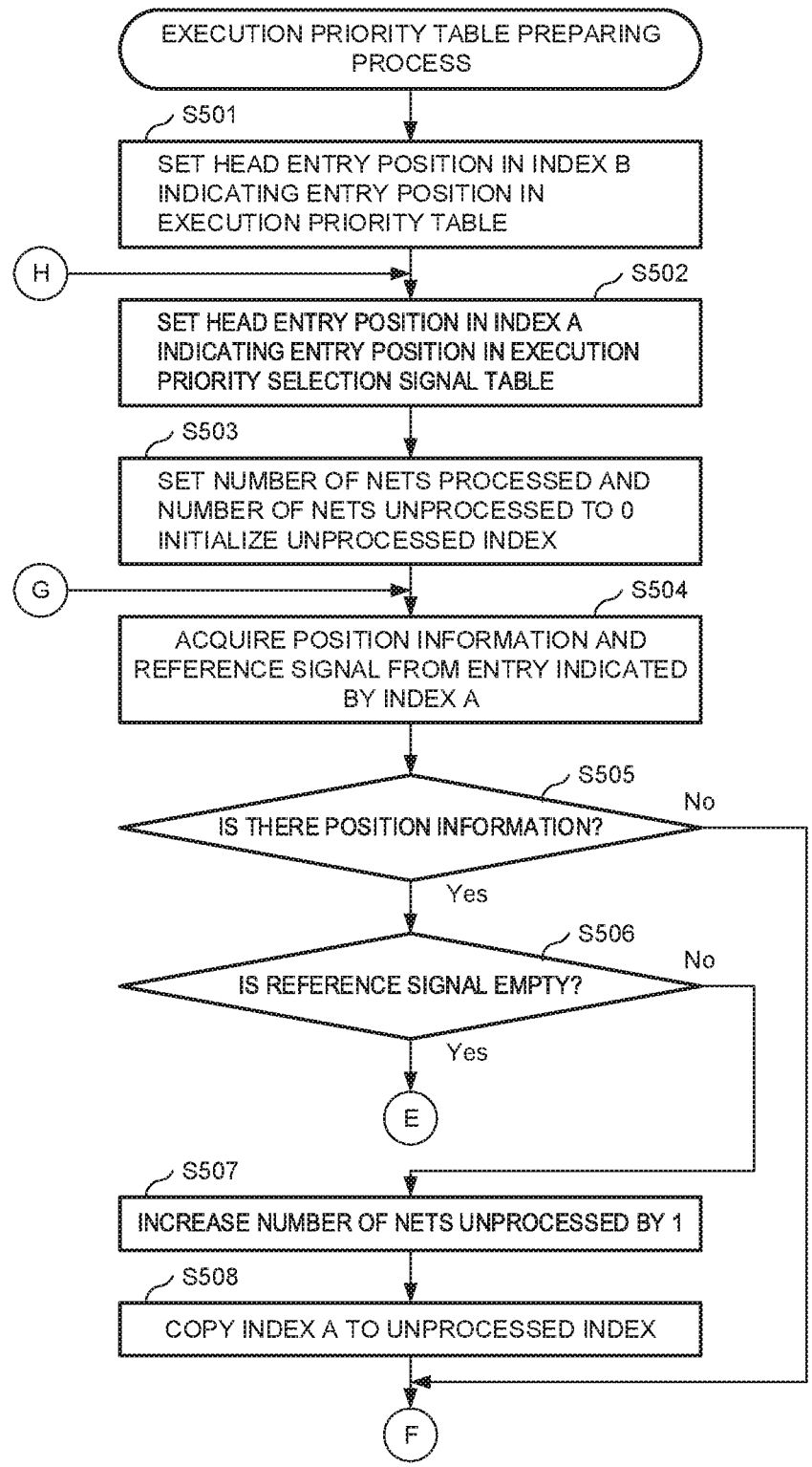

LADDER PROGRAM ANALYZING DEVICE

RELATED APPLICATIONS

The present application claims priority to Japanese Application Number 2016-100578 filed May 19, 2016, the disclosure of which is hereby incorporated by reference herein in its entirety.

BACKGROUND OF THE INVENTION

1. Field of the Invention

The present invention relates to a ladder program analyzing device, and more particularly to a ladder program analyzing device that can present information for improving execution efficiency of a ladder program.

2. Description of the Related Art

A ladder program executes ladder circuits which have been prepared in advance sequentially and repeatedly with a predetermined cycle. In general, in preparing a ladder program, an order of ladder circuits is determined such that a signal state is updated as efficiently as possible by one execution in consideration of a reference relationship between signals.

As a technique for efficiently preparing a ladder program, a programming device that automatically generates a ladder program using ladder circuits which are produced as modules in advance is described in Japanese Patent Application Laid-Open No. 05-189012.

JP 3666507 B2 describes a simulation assisting tool that can automatically generate a ladder program for test input outputting a signal to a node which is used for a ladder.

JP 4922684 B2 describes a program editing device that automatically generates a ladder program on the basis of a timing chart.

However, none of the above-mentioned documents describe improvement in execution efficiency of a ladder program based on an order of ladder circuits. For example, in a ladder program illustrated in FIG. 1, a process until a signal state of A is output to C is completed by one execution of the program. On the other hand, in a ladder program illustrated in FIG. 2, two executions of the program are required until a signal state of A is output to C. At this time, the ladder program illustrated in FIG. 1 has a shorter update time and better execution efficiency. In other words, the ladder program illustrated in FIG. 2 has a longer update time and worse execution efficiency.

Although ladder circuits having long update times may be intentionally put together, a ladder program is designed to improve the execution efficiency in most cases. In general, when a ladder program is large, when a program is structuralized to include a subprogram or the like, a reference relationship between signals is not understood easily and therefore it is difficult to determine execution efficiency of the ladder program. That is, even when ladder circuits are arranged in a poor execution efficiency order, a user cannot easily understand that effect. Accordingly, the user needs to manually find out a place in which the order of the ladder circuits can be corrected by executing the ladder program, sampling signals updated by the ladder circuits, confirming that the signals vary at intentional timings, and the like.

SUMMARY OF THE INVENTION

The present invention is made to solve the above-mentioned problems and an object thereof is to provide a ladder program analyzing device that can present information for improving execution efficiency of a ladder program.

A ladder program analyzing device according to an embodiment of the present invention includes: a ladder program analyzing unit that analyzes a ladder program including a plurality of ladder circuits and prepares an execution priority signal table in which execution priorities of the ladder circuits, reference signals indicating signals input to the ladder circuits, and update signals indicating signals output from the ladder circuits are correlated with each other; and a ladder program analysis result displaying unit that determines presence or absence of the ladder circuit improvable in execution efficiency by comparing the execution priorities, the reference signals, and the update signals of two of the ladder circuits on the basis of the execution priority signal table and displays the determination result.

In a ladder program analyzing device according to another embodiment of the present invention, the ladder program analysis result displaying unit displays the determination result by changing at least a display format of the ladder circuit which is determined to be improvable in execution efficiency.

A ladder program analyzing device according to another embodiment of the present invention includes: a ladder program analyzing unit that analyzes a ladder program including a plurality of ladder circuits and prepares an execution priority signal table in which execution priorities of the ladder circuits, reference signals indicating signals input to the ladder circuits, and update signals indicating signals output from the ladder circuits are correlated with each other; and a ladder program sorting unit that determines the execution priorities of the ladder circuits improvable in execution efficiency of the ladder program by comparing the execution priorities, the reference signals, and the update signals of the plurality of ladder circuits on the basis of the execution priority signal table.

According to the present invention, it is possible to provide a ladder program analyzing device that can present information for improving execution efficiency of a ladder program.

BRIEF DESCRIPTION OF THE DRAWINGS

The above and other objects and features of the present invention will be obvious from the ensuing description of embodiments with reference to the accompanying drawings, wherein:

FIG. 4 is a diagram illustrating an example of an execution priority signal table;

FIG. 10 is a diagram illustrating an operation example of the ladder program sorting unit;

FIG. 11 is a diagram illustrating an operation example of the ladder program sorting unit;

FIG. 12 is a diagram illustrating an operation example of the ladder program sorting unit;

FIG. 13 is a diagram illustrating an operation example of the ladder program sorting unit;

FIG. 14 is a diagram illustrating an operation example of the ladder program sorting unit;

FIG. 15 is a diagram illustrating an operation example of the ladder program sorting unit;

FIG. 16 is a diagram illustrating an operation example of the ladder program sorting unit;

FIG. 17 is a diagram illustrating an operation example of the ladder program sorting unit;

FIG. 22A is a diagram illustrating an example of an execution priority table preparing process which is performed by the ladder program sorting unit;

DETAILED DESCRIPTION OF THE PREFERRED EMBODIMENTS

An outline of the present invention will be first described below. The present invention is characterized by a technique of analyzing execution efficiency of a ladder program, and two methods of using an analysis result are disclosed in embodiments of the present invention.

In a first embodiment, a technique of displaying information on a part having poor execution efficiency in a ladder program on a ladder diagram using the analysis result of the ladder program is disclosed. For example, a node in which a signal is efficiently processed is displayed in blue and a node having poor efficiency is displayed in red.

In a second embodiment, a technique of automatically sorting ladder circuits to achieve an efficient execution priority in a ladder program within an arbitrary range is disclosed.

First Embodiment

As the first embodiment, a ladder program analyzing device 100 that can analyze execution efficiency of a ladder program and display at least information on a part having poor execution efficiency on a ladder diagram will be described below.

Figure 24:
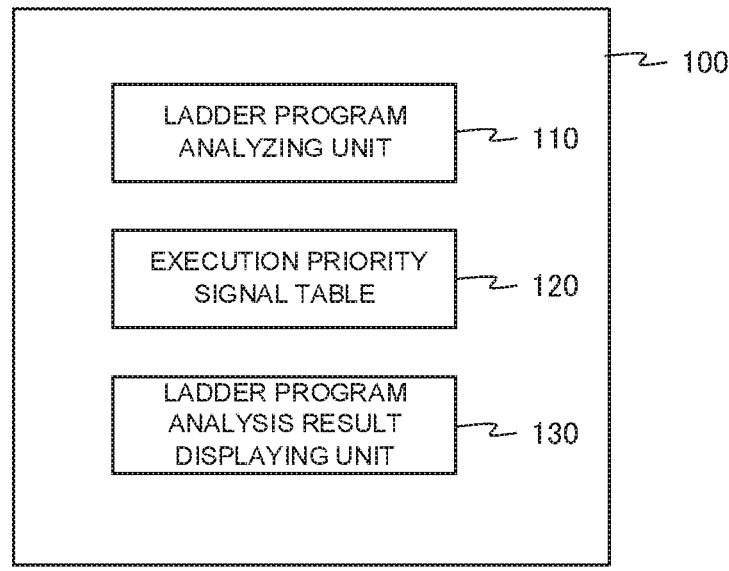
FIG. 24 is a diagram illustrating configuration of a ladder program analyzing device according to a first embodiment of the present invention.

A configuration of the ladder program analyzing device 100 will be described with reference to a block diagram illustrated in FIG. 24. The ladder program analyzing device 100 includes a ladder program analyzing unit 110, an execution priority signal table 120, and a ladder program analysis result displaying unit 130. The ladder program analyzing device 100 is typically an information processing device that includes a central processing unit, a storage unit, and an input/output unit and that embodies a predetermined function by causing the central processing unit to execute a program stored in the storage unit.

The ladder program analyzing unit 110 performs a process of analyzing an order of ladder circuits in a ladder program, preparing an execution priority signal table 120, and evaluating execution efficiency on the basis of the execution priority signal table 120.

The execution priority signal table 120 is a table indicating in what order to execute the ladder circuits when the ladder program is executed. The execution priority signal table 120 is typically prepared in a storage area in the storage unit which is not illustrated.

Figure 1:
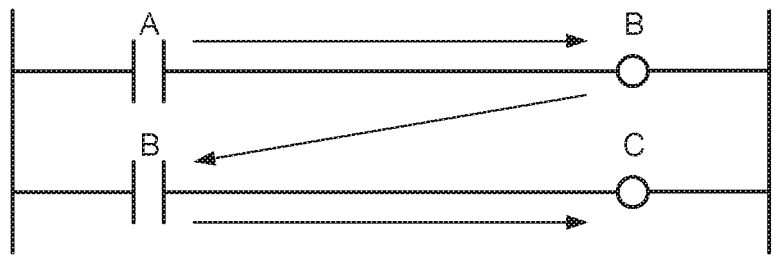
FIG. 1 is a diagram for describing a problem of the present invention.
Figure 2:
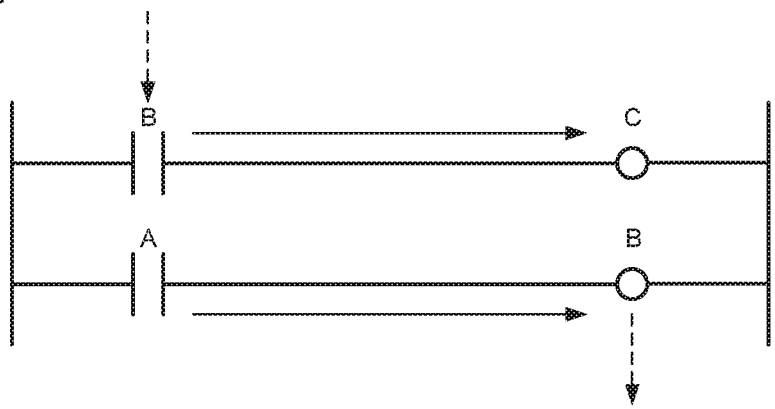
FIG. 2 is a diagram for describing a problem of the present invention.
Figure 3:
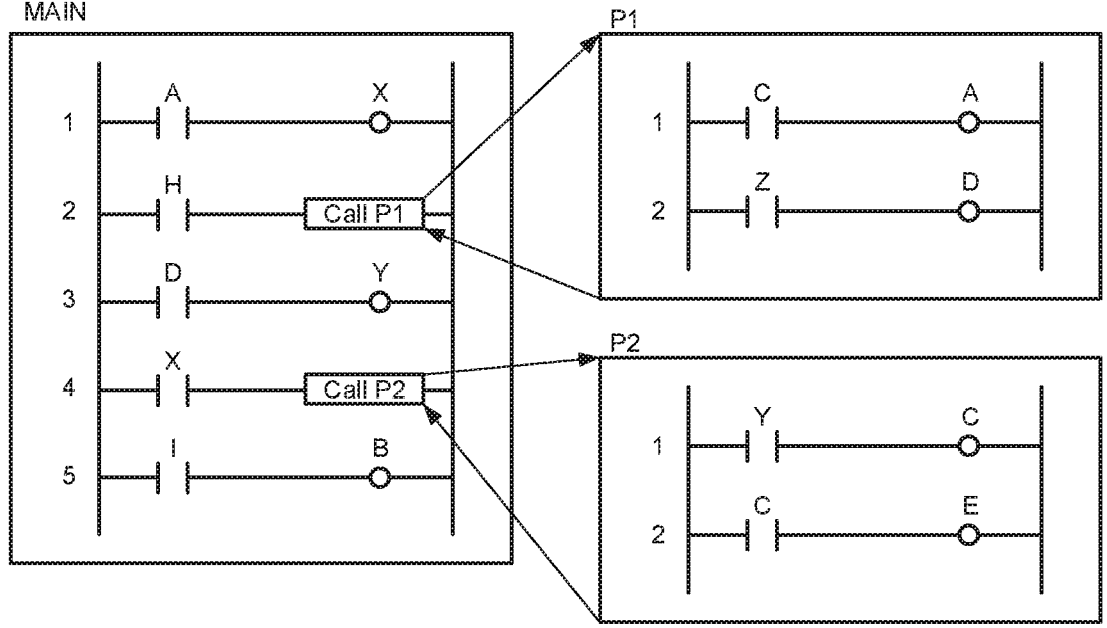
FIG. 3 is a diagram illustrating an example of a ladder program.

As illustrated in FIG. 3, the ladder program generally includes a plurality of programs (a main program and one or more subprograms which are called by the main program or a subprogram). Each program includes one or more nets including ladder circuits. The nets are numbered and are sequentially executed in an ascending order of the numbers.

FIG. 4 illustrates an execution priority signal table 120 which is prepared by analyzing the ladder program illustrated in FIG. 3. The ladder program analyzing unit 110 sequentially analyzes the nets in the execution priorities of the ladder circuits from the head to the tail of the ladder program. The ladder program analyzing unit 110 registers position information, reference signals, and update signals of the nets in the execution priority signal table 120. Here, the position information includes a program name to which the corresponding net belongs and a net position thereof. When the ladder program includes a single program, the position information may not include a program name. The reference signal is a name of a signal which is referred to by the corresponding net. The update signal is a name of a signal which is updated by the corresponding net.

The ladder program analysis result displaying unit 130 performs a process of determining an optimized state of the ladder program with reference to the execution priority signal table 120 and presenting the determination result to a user. Typically, a part having poor execution efficiency in the ladder program is extracted and the extracted part is displayed on a ladder diagram.

Figure 5:
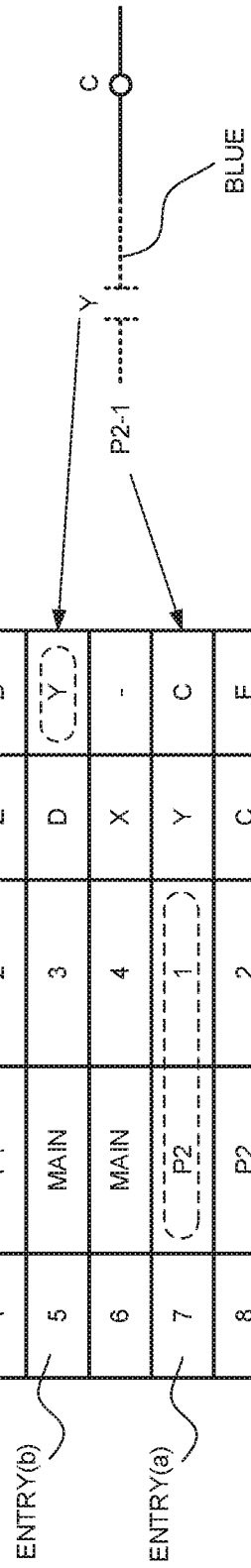
FIG. 5 is a diagram illustrating an output example of a ladder program analysis result displaying unit.

More specifically, when the ladder diagram is displayed on a screen, the ladder program analysis result displaying unit 130 extracts an entry (a) related to a ladder circuit to be displayed and an entry (b) including a node on the ladder circuit as an update signal from the execution priority signal table 120. An example thereof is illustrated in FIG. 5. Here, the ladder program analysis result displaying unit 130 is going to draw Net 1 of Subprogram P2 (P2-1). Before the drawing, the ladder program analysis result displaying unit 130 extracts an entry (a) corresponding to P2-1 from the execution priority signal table 120. The entry (a) includes a node (that is, a reference signal) Y. Therefore, the ladder program analysis result displaying unit 130 also extracts an entry (b) including Y as an update signal from the execution priority signal table 120.

Then, the ladder program analysis result displaying unit 130 compares the execution priorities of the entry (a) and the entry (b). The comparison result of the execution priorities of both entries is reflected in the display formats of the ladder circuits. The ladder program analysis result displaying unit 130 presents a part having poor execution efficiency in the ladder program to the user on the basis of the difference in display format. Accordingly, the user can easily determine whether the execution priorities of the ladder circuits are optimal.

For example, when the execution priority of the entry (a)> the execution priority of the entry (b) is satisfied, the priorities of the ladder circuits are optimal and the execution efficiency is good. At this time, the ladder program analysis result displaying unit 130 can display a node Y of the ladder circuit P2-1 in blue. On the other hand, when the execution priority of the entry (a) the execution priority of the entry (b) is satisfied, the priorities of the ladder circuits are not optimal and the execution efficiency cannot be said to be good. At this time, the ladder program analysis result displaying unit 130 can display the node Y of the ladder circuit P2-1 in red. Goodness and badness of the execution efficiency can be expressed using various methods. For example, the goodness and badness of the execution efficiency may be expressed by a background color of a node instead of the color of the node. Alternatively, the goodness and badness of the execution efficiency may be expressed by displaying a predetermined sign, figure, message, or the like in the vicinity of the node.

Figure 6:
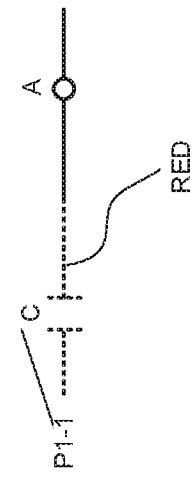
FIG. 6 is a diagram illustrating an output example of the ladder program analysis result displaying unit.
Figure 7:
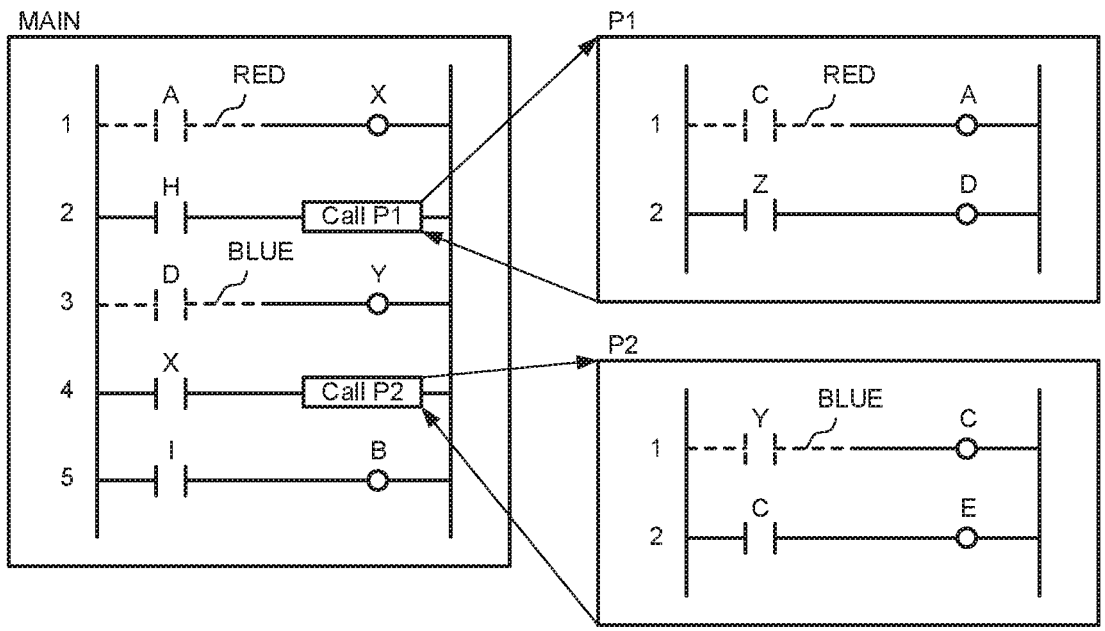
FIG. 7 is a diagram illustrating an output example of the ladder program analysis result displaying unit.

Examples of a display which is performed by the ladder program analysis result displaying unit 130 will be described below with reference to FIGS. 5 to 7. In the example illustrated in FIG. 5, the execution priority of the entry (a)> the execution priority of the entry (b) is satisfied.

Accordingly, the ladder program analysis result displaying unit 130 displays the node Y in the ladder circuit P2-1 in blue. On the other hand, in the example illustrated in FIG. 6, the execution priority of the entry (a) the execution priority of the entry (b) is satisfied. Accordingly, the ladder program analysis result displaying unit 130 displays a node C in the ladder circuit P1-1 in red. Similarly, the ladder program analysis result displaying unit 130 displays a node A in Net 1 of the main program in red and displays a node D in Net 3 of the main program in blue.

Figure 18:
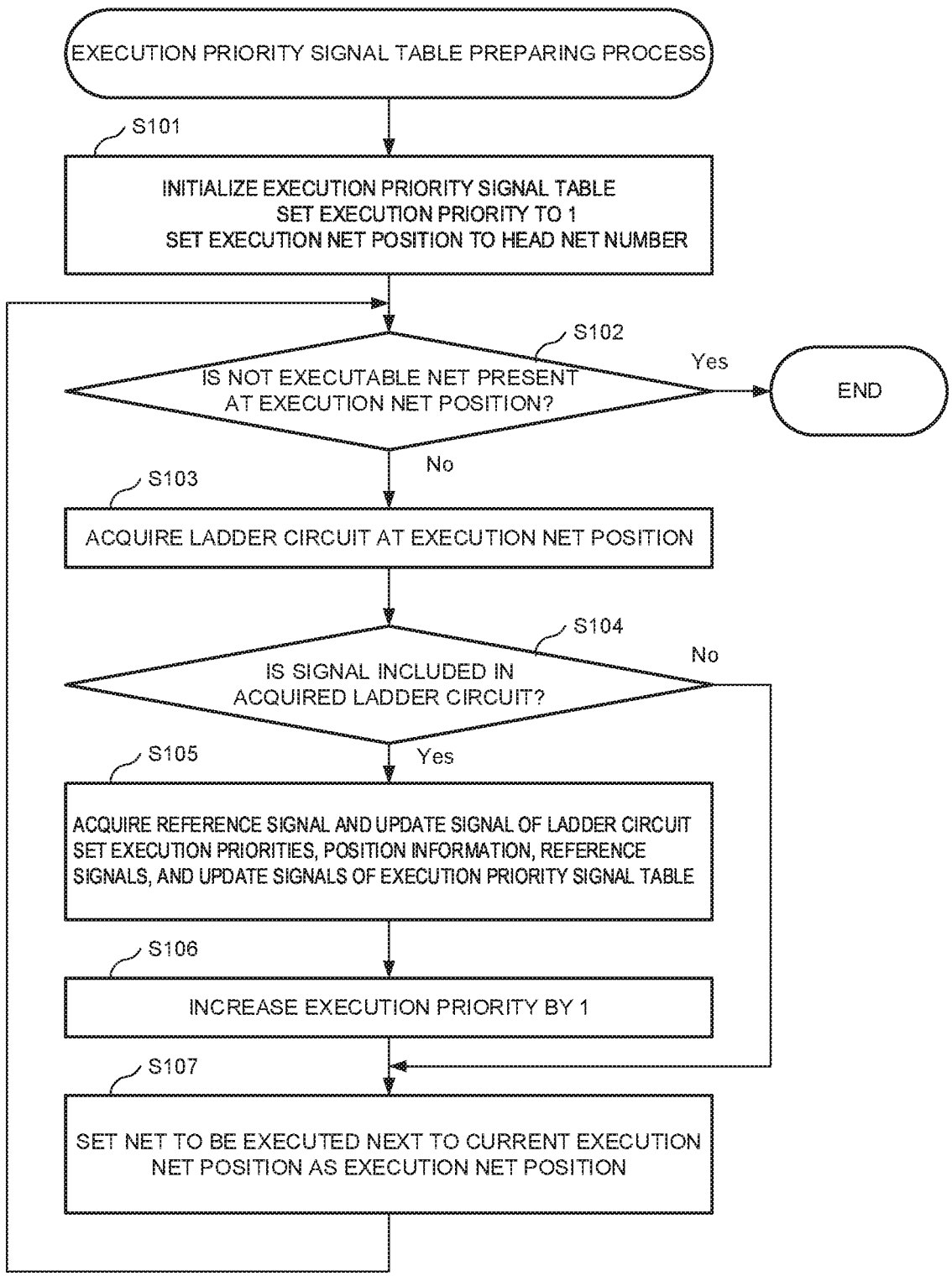
FIG. 18 is a diagram illustrating an example of an execution priority signal table preparing process which is performed by a ladder program analyzing unit.

An example of an operation of the ladder program analyzing device 100 will be described below with reference to FIGS. 18, 19A, and 19B. FIG. 18 is a flowchart illustrating an example of a process of causing the ladder program analyzing unit 110 to prepare the execution priority signal table 120 indicating a relationship between the execution priorities of the ladder program and the signals (an execution priority signal table preparing process).

S101:

The ladder program analyzing unit 110 first initializes the execution priority signal table 120. A variable "execution priority" in which an execution priority of a program is recorded is set to 1. A variable "execution net position" in which an execution net position of the ladder program is stored is set to a head net number of the program.

S102:

The ladder program analyzing unit 110 determines whether an executable net is present at the "execution net position." When an executable net is not present, the process flow ends.

S103:

The ladder program analyzing unit 110 acquires a ladder circuit corresponding to the "execution net position" by one net. When the acquired ladder circuit is a CALL command or a RET command and a command similar thereto, a net to be executed in the next time is a head net of a subprogram of a call destination in the CALL command and is a net next to the corresponding CALL command in the RET command.

S104:

The ladder program analyzing unit 110 determines whether a node is included in the acquired ladder circuit. The process flow transitions to S105 when a node is included therein, and the process flow transitions to S107 when a node is not included therein.

S105:

The ladder program analyzing unit 110 acquires a signal read from the node by the ladder circuit as a "reference signal" and acquires a signal written thereto as an "update signal." A current "execution priority" is defined as an "execution priority" and the "execution net position" is defined as "position information." "Execution priority," "position information," "reference signal," and "update signal" are registered in the execution priority signal table 120.

S106:

The ladder program analyzing unit 110 increases the "execution priority" by one to register a next entry in the execution priority signal table 120.

S107:

The ladder program analyzing unit 110 sets a position of a net which is executed next to the current "execution net position" as a new "execution net position." At this time, as described above with reference to S103, when a CALL command or a RET command is present at the current "execution net position," a net to be executed in the next time is set in consideration thereof.

Thereafter, the ladder program analyzing unit 110 sequentially acquires ladder circuits which are present at the "execution net position" until an executable net is not present at the "execution net position," and sets "execution priority," "position information," "reference signal," and "update signal" for the acquired ladder circuits in the execution priority signal table 120. Accordingly, the "execution priority signal table" is completed.

Figure 19A:
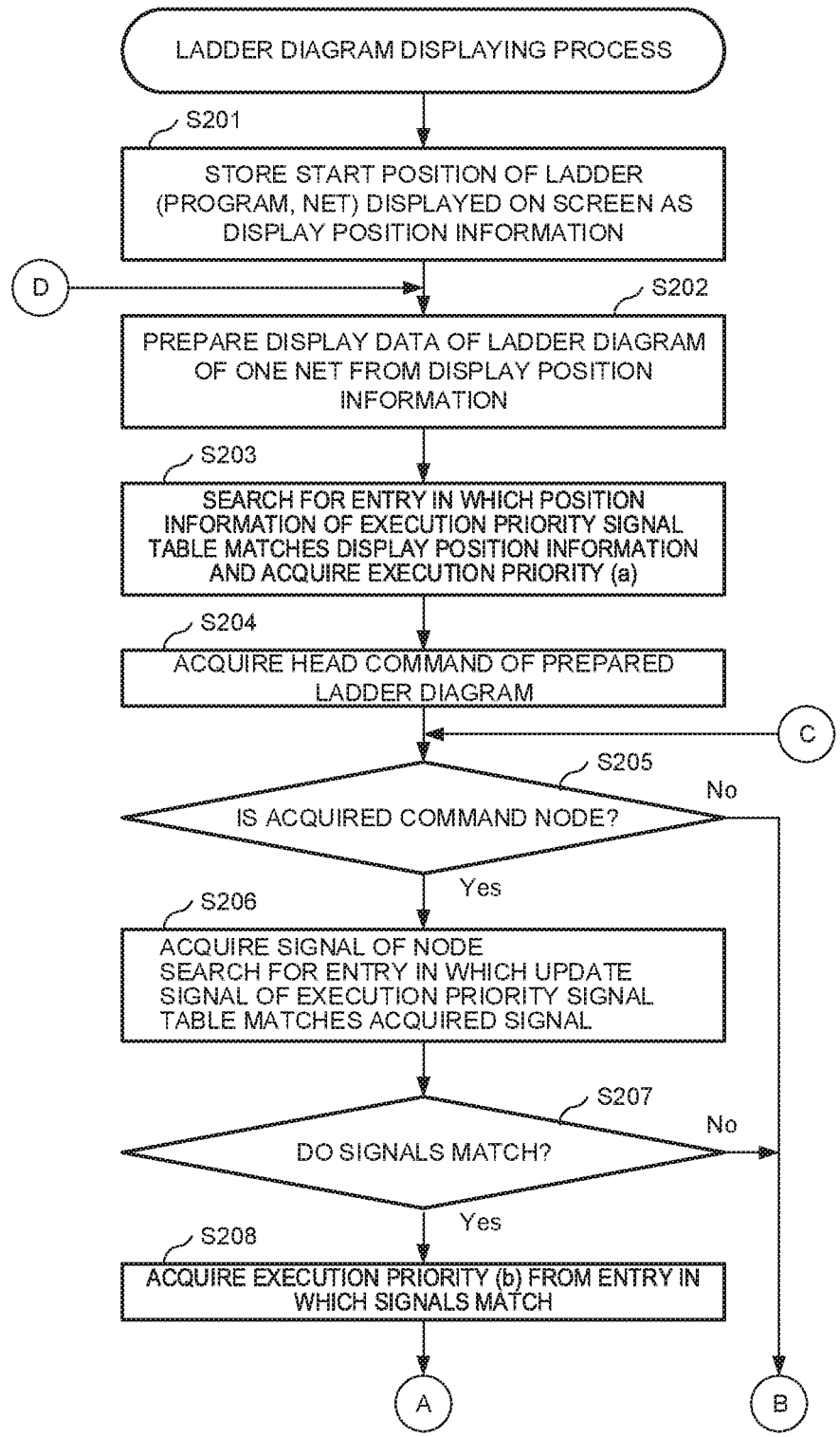
FIG. 19A is a diagram illustrating an example of a ladder diagram displaying process which is performed by the ladder program analysis result displaying unit.
Figure 19B:
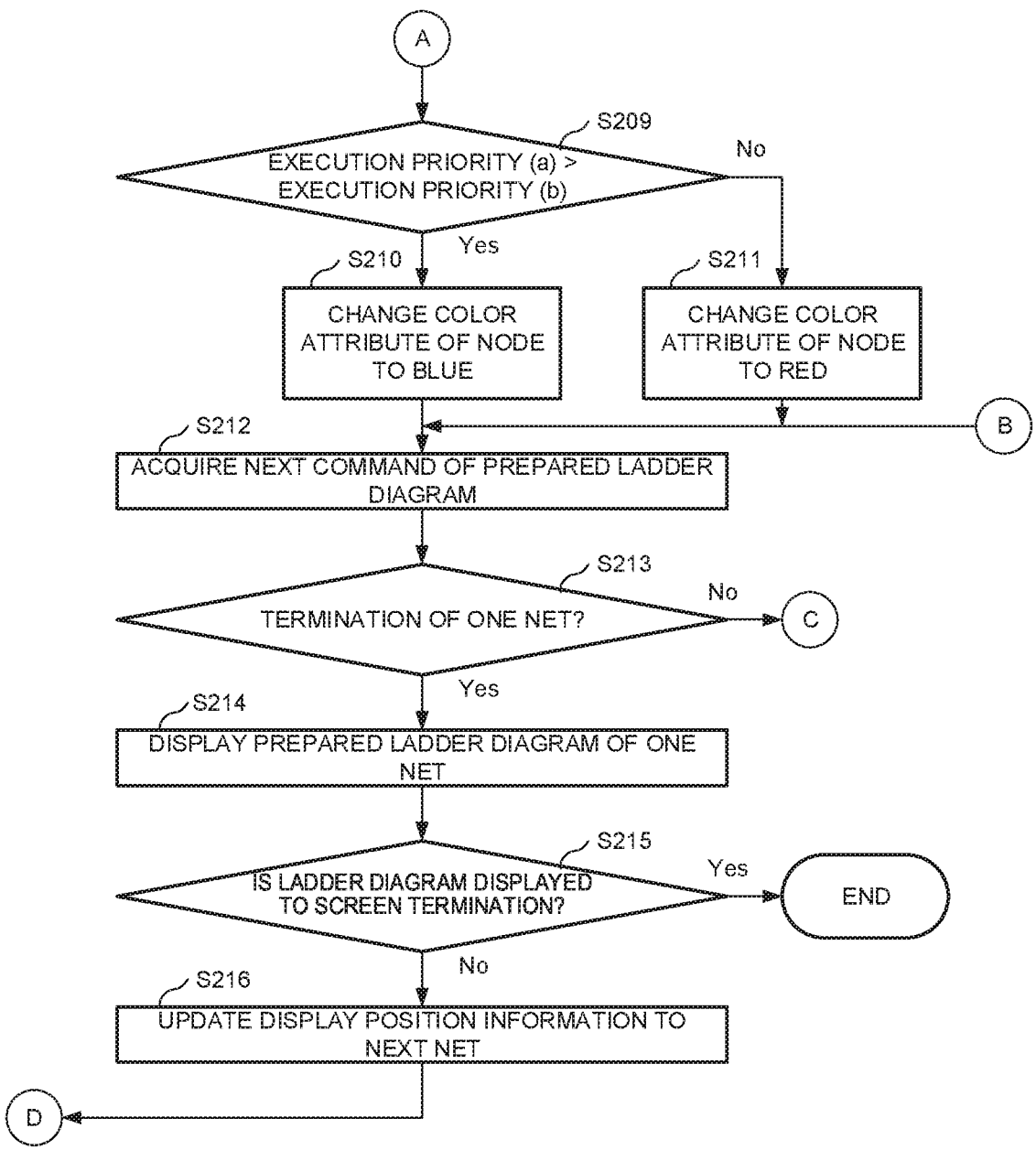
FIG. 19B is a diagram illustrating an example of a ladder diagram displaying process which is performed by the ladder program analysis result displaying unit.

FIGS. 19A and 19B are flowcharts illustrating a process of causing the ladder program analysis result displaying unit 130 to reflect an execution efficiency determination result of each ladder circuit in the ladder diagram (a ladder diagram displaying process).

S201:

The ladder program analysis result displaying unit 130 first stores a start position (a program and a net) of the ladder program to be displayed on the screen as "display position information."

S202:

The ladder program analysis result displaying unit 130 prepares display data of a ladder diagram of one net corresponding to the stored "display position information."

S203:

The ladder program analysis result displaying unit 130 extracts an entry corresponding to the "display position information" stored in the "position information" of the execution priority signal table 120 with reference to the execution priority signal table 120 which has been prepared by the execution priority signal table preparing process. Then, the "execution priority" (a) of the entry is acquired.

S204 to S206:

The ladder program analysis result displaying unit 130 acquires a "signal" of a node when the node is included in the ladder diagram of one net prepared in S202. The execution priority signal table 120 is searched sequentially from an entry having the smallest "execution priority" to the final entry, and it is checked whether the same "update signal" as the acquired "signal" is present.

S207 to S208:

When an entry in which the "signal" acquired from the node is equal to the "update signal" is found, the ladder program analysis result displaying unit 130 acquires an "execution priority" (b) of the entry. On the other hand, when both signals are not equal, the process flow transitions to S212, and a next command of the prepared ladder diagram is acquired.

S209 to S211:

The ladder program analysis result displaying unit 130 compares the "execution priority" (a) and the "execution priority" (b). When the "execution priority" (a) is larger, the color attribute of the node is changed to blue. Otherwise, the color attribute of the node is changed to red.

S212 to S213:

The ladder program analysis result displaying unit 130 acquires a next command included in the ladder diagram.

When the acquired command is a node, the processes of S206 and subsequent thereto are performed again on the node.

The ladder program analysis result displaying unit 130 prepares display data of the ladder diagram of one net by repeatedly performing the same processes until reaching a termination of one net, that is, until reaching the final of the ladder diagram.

S214:

The ladder program analysis result displaying unit 130 displays the prepared display data of the ladder diagram of one net on the screen.

S215:

When the display of the ladder diagram does not reach the termination of the screen, the ladder program analysis result displaying unit 130 updates the "display position information" to information of the next net. The ladder program analysis result displaying unit 130 similarly performs the processes of S202 and subsequent thereto on the next net. By repeating this until the display of the ladder diagram reaches the termination of the screen, the ladder program analysis result displaying unit 130 can display a series of ladder diagrams in which the execution efficiency determination result is reflected in the display colors of the nodes in the ladder diagram.

According to this embodiment, the ladder program analyzing unit 110 analyzes a ladder program and prepares the execution priority signal table 120, and the ladder program analysis result displaying unit 130 displays a ladder diagram in which the execution efficiency determination result is reflected on the basis of the execution priority signal table 120. Accordingly, since apart which is improvable in execution efficiency is apparently displayed in the ladder diagram, it serves as a clue for reviewing optimization of the ladder program.

Second Embodiment

As a second embodiment, a ladder program analyzing device 100 that can analyze execution efficiency of a ladder program and automatically sort ladder circuits such that the execution efficiency is improved will be described below.

Figure 25:
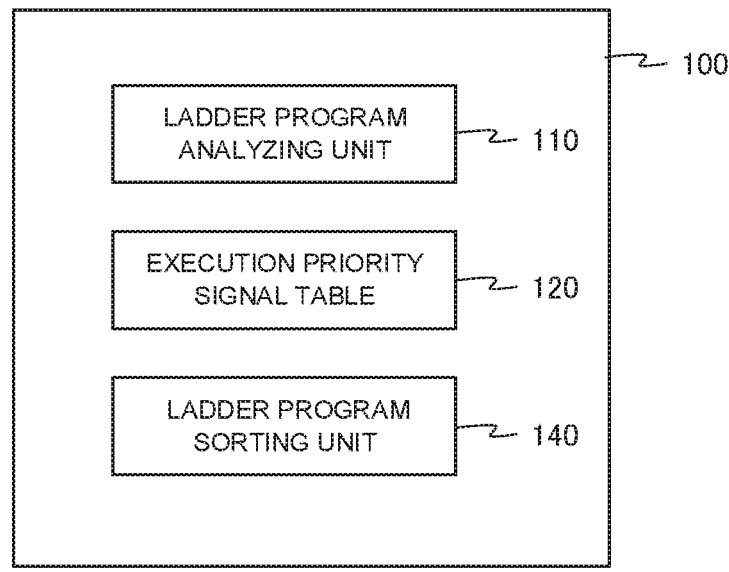
FIG. 25 is a diagram illustrating configuration of a ladder program analyzing device according to a second embodiment of the present invention.

The configuration of the ladder program analyzing device 100 will be described with reference to the block diagram illustrated in FIG. 25. The ladder program analyzing device 100 includes a ladder program analyzing unit 110, an execution priority signal table 120, and a ladder program sorting unit 140.

The ladder program analyzing unit 110 and the execution priority signal table 120 have the same configurations as in the first embodiment and thus description thereof will not be repeated.

The ladder program sorting unit 140 performs a process of automatically sorting and optimizing execution priorities of nets in a predetermined range of a ladder program. The ladder program sorting unit 140 automatically optimizes the execution priorities of a net in an arbitrary range on the basis of the execution priority signal table 120 and a list of signals which are referred to by each net. Here, the predetermined range may be a part of the ladder program which is determined on the basis of a user's selection or may be a whole of the ladder program.

A ladder program sorting operation which is performed by the ladder program sorting unit 140 is an operation of determining an arrangement order of nodes such that as many edges as possible have the same direction when all nodes are arranged in a line in an oriented graph in which the ladder circuits are defined as nodes and a reference relationship between signals are defined as edges. In this regard, several other algorithms from which the same effect can be achieved are conceivable. Although one specific example thereof is described herein, the sorting may be performed using another algorithm from which the same effect can be achieved.

Figures 8, 9:
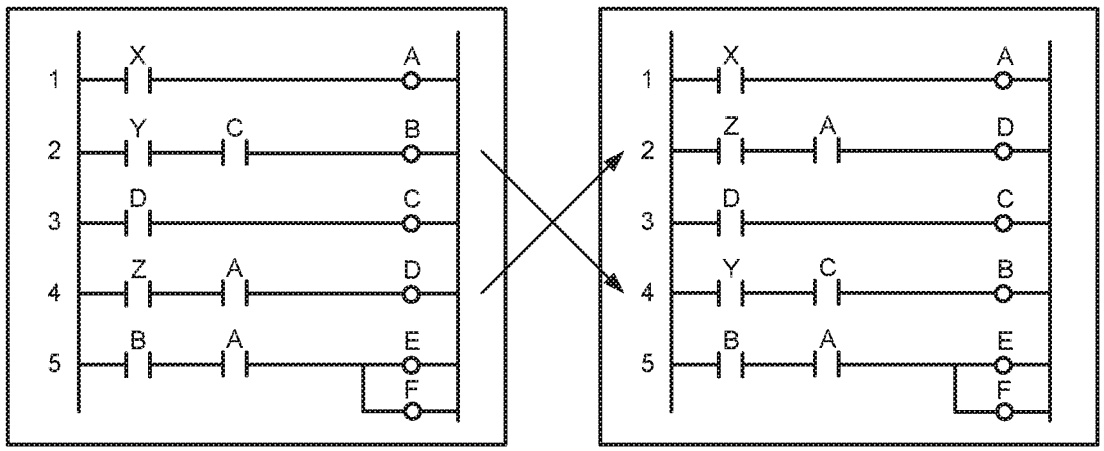
FIG. 8 is a diagram illustrating an operation example of a ladder program sorting unit.
FIG. 9 is a diagram illustrating an operation example of the ladder program sorting unit.

A process which is performed by the ladder program sorting unit 140 will be more specifically described with reference to FIGS. 8 to 17. The left-upper part of FIG. 8 illustrates a ladder program before being sorted, and the left-lower part illustrates the execution priority signal table 120 corresponding to the ladder program. The upper-right part illustrates the ladder program after being sorted by the ladder program sorting unit 140.

(1) The ladder program sorting unit 140 first deletes a non-updated "reference signal" in the predetermined range from the execution priority signal table 120 illustrated in FIG. 8. Signals surrounded with dotted lines in FIG. 9 are the non-updated "reference signal."

(2) Then, the ladder program sorting unit 140 finds out a net in which the "reference signal" is empty in the execution priority signal table 120, and adds position information of the found net to an "execution priority table." Parts surrounded with dotted lines in FIG. 10 indicate that the "reference signal" is empty.

(3) The ladder program sorting unit 140 deletes all the same signals as the "update signals" of the net added to the "execution priority table" from the "reference signals" of the "execution priority signal table." Parts surrounded with dotted lines in FIG. 11 indicate deleted "reference signals."

(4) The ladder program sorting unit 140 deletes the net added to the "execution priority table" from the execution priority signal table 120. Apart surrounded with a dotted line in FIG. 12 indicates a deleted net.

(5) The ladder program sorting unit 140 repeats the operations of (2) to (4) until the execution priority signal table 120 is empty. When the corresponding net is not found in (2), one net can be selected with a certain evaluation criterion. FIGS. 13 to 17 illustrate states in which nets are sequentially deleted from the execution priority signal table 120.

(6) The ladder program sorting unit 140 acquires a net of "position information" from the "execution priority table" depending on the "execution priorities" and rearranges the nets in the acquired order. Accordingly, a ladder program in which the execution priorities are optimized is prepared.

Figure 20:
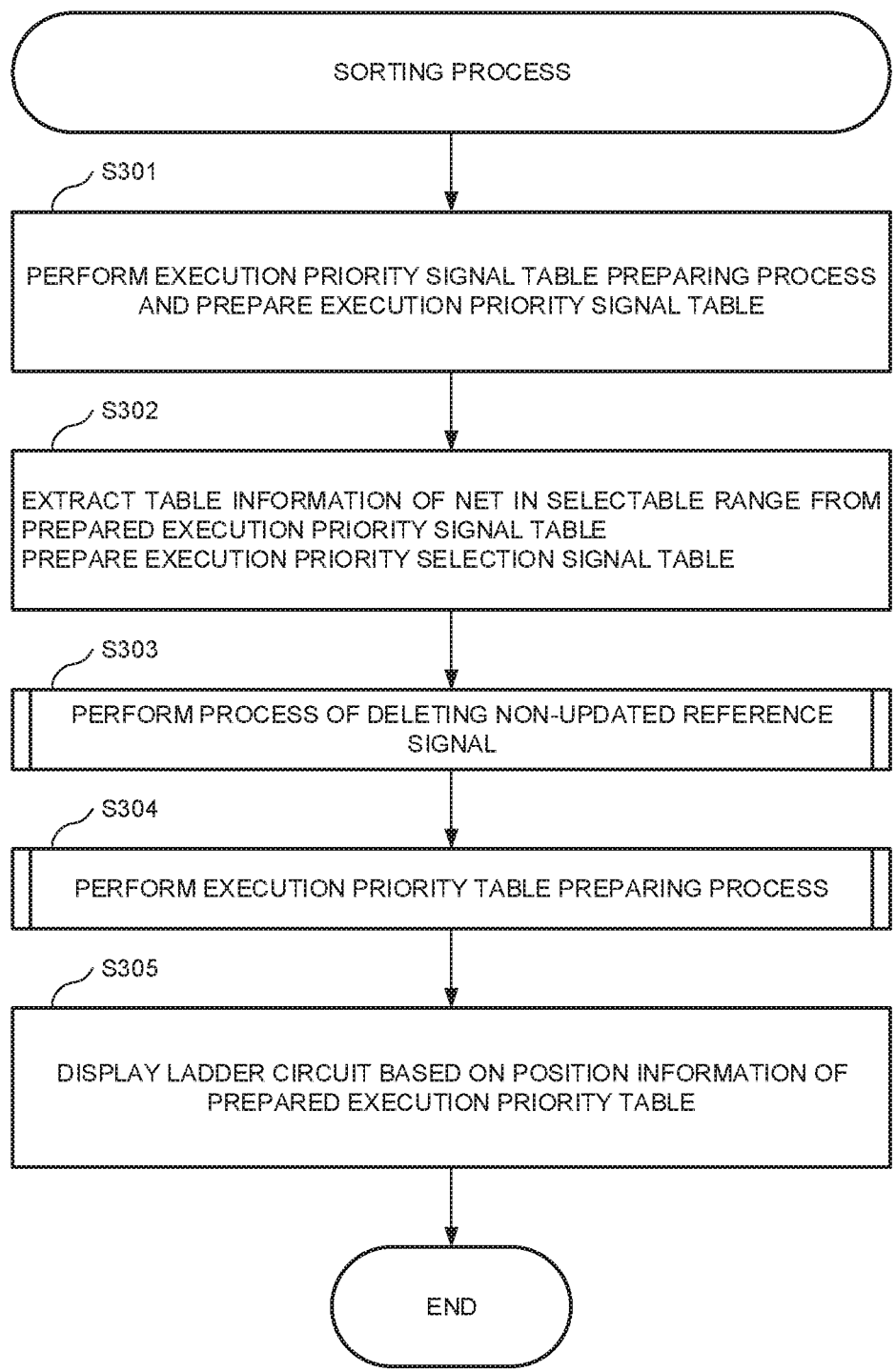
FIG. 20 is a diagram illustrating an example of a sorting process which is performed by the ladder program sorting unit.

An operation in which the ladder program analyzing device 100 automatically sorts and optimizes the execution priorities of nets in a predetermined range will be described below with reference to FIG. 20 to FIGS. 23A and 23B. FIG. 20 is a flowchart illustrating a process of causing the ladder program sorting unit 140 to automatically sort ladder circuits in a predetermined range of a ladder program for each net to achieve an efficient execution priority (a sorting process).

S301:
The ladder program analyzing unit 110 performs the "execution priority signal table preparing process" to prepare the "execution priority signal table 120."

S302:
The ladder program sorting unit 140 extracts table information of nets in a predetermined range of the ladder program from the prepared execution priority signal table 120 and prepares an "execution priority selection signal table."

S303:
The ladder program sorting unit 140 performs a "non-updated reference signal deleting process" (to be described later) and deletes non-updated "reference signals" from the "execution priority selection signal table."

S304:
The ladder program sorting unit 140 performs an "execution priority table preparing process" (to be described later) and prepares an "execution priority table."

S305:
The ladder program sorting unit 140 sorts the ladder circuits in a new order on the basis of the prepared "execution priority table." Accordingly, the ladder program in the predetermined range is automatically corrected to achieve the efficient execution priority.

Figure 21:
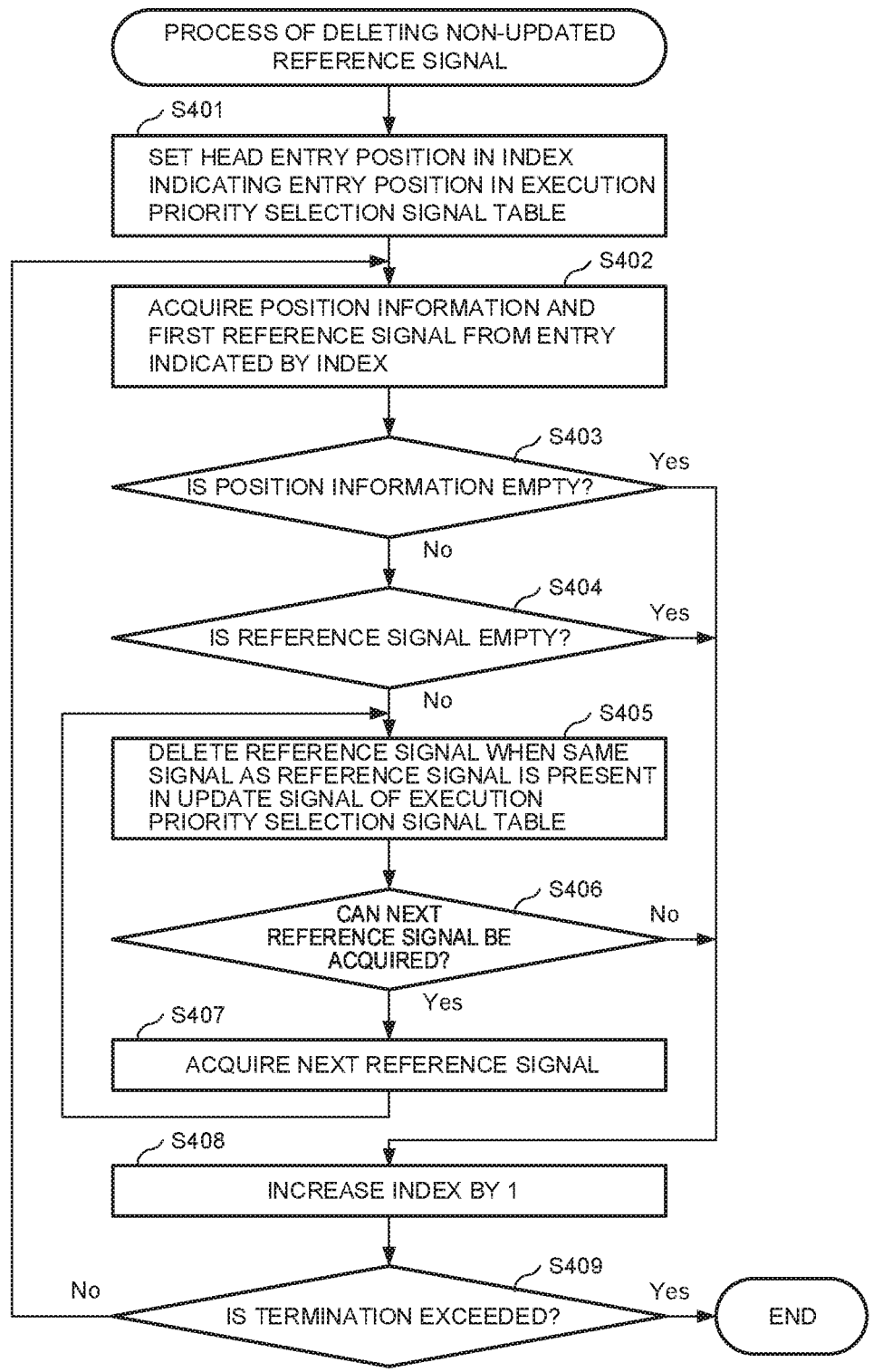
FIG. 21 is a diagram illustrating an example of a process of deleting a non-updated reference signal which is performed by the ladder program sorting unit.

FIG. 21 is a flowchart illustrating a process of deleting all non-written "reference signals" (a non-updated reference signal deleting process) on the basis of the "update signals" in the "execution priority selection signal table."

S401:
The ladder program sorting unit 140 prepares a variable "index" indicating an entry position in the "execution priority selection signal table" and sets a head entry position in the "index."

S402:
The ladder program sorting unit 140 acquires "position information" and a "reference signal" from the entry indicated by the "index" in the "execution priority selection signal table."

S403:
When the acquired "position information" is empty, the ladder program sorting unit 140 increases the "index" by one. When the index does not exceed the termination of the "execution priority selection signal table," the processes of S402 and subsequent thereto are performed again using a new "index."

S404:
When the acquired "reference signal" is empty, the ladder program sorting unit 140 increases the "index" by one. When the index does not exceed the termination of the "execution priority selection signal table," the processes of S402 and subsequent thereto are performed again using a new "index."

S405:
When both of the acquired "position information" and the acquired "reference signal" are not empty, the ladder program sorting unit 140 checks whether the same signal as the "reference signal" is present in the "update signals" in the "execution priority selection signal table." When the same signal is present, the "reference signal" in the "execution priority selection signal table" is deleted.

S406 to S407:
When a "reference signal" next to the "reference signal" of the entry indicated by the "index" in the "execution priority selection signal table" is present, the ladder program sorting unit 140 performs the processes of S405 and subsequent thereto on the next "reference signal" again. That is, the process of deleting the "reference signal" in the "execution priority selection signal table" is repeatedly performed.

S408:
On the other hand, when the next "reference signal" is not present, the ladder program sorting unit 140 increases the "index" by one. Unless the "index" does not exceed the termination, the processes of S402 and subsequent thereto are repeatedly performed. When the "index" exceeds the termination, the process flow ends.

Figure 22B:
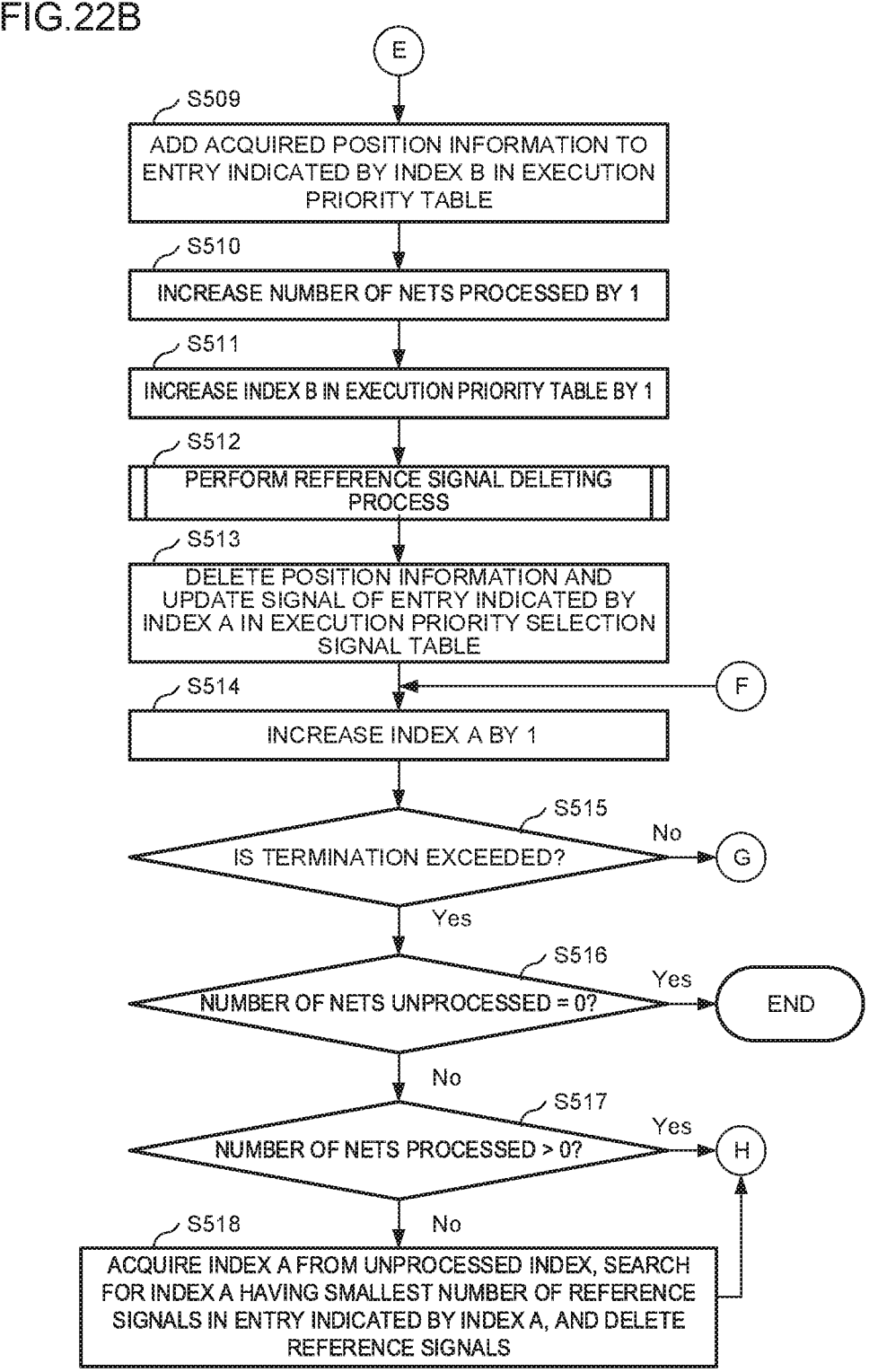
FIG. 22B is a diagram illustrating an example of the execution priority table preparing process which is performed by the ladder program sorting unit.

FIGS. 22A and 22B are flowcharts illustrating a process of causing the ladder program sorting unit 140 to determine an optimal execution priority of a ladder circuit (an execution priority table preparing process) using the "execution priority selection signal table" and the "execution priority table."

S501:
The ladder program sorting unit 140 prepares a variable "index B" indicating an entry position in the "execution priority table" and sets a head entry position.

S502:
The ladder program sorting unit 140 sets the head entry position in a variable "index A" indicating an entry position in the "execution priority selection signal table."

S503:
The ladder program sorting unit 140 initializes a variable "number of nets processed" in which a frequency of adding "position information" to the "execution priority table" from the "execution priority selection signal table" is stored, a variable "number of nets unprocessed" in which a frequency incapable of adding "position information" is stored, and a variable "unprocessed index" in which an index in the "execution priority selection signal table" incapable of adding "position information" is stored.

S504:
The ladder program sorting unit 140 acquires "position information" and a "reference signal" from an entry indicated by the "index A" in the "execution priority selection signal table."

S505:
When data is not present in the "position information," the ladder program sorting unit 140 increases the "index A" by one. Here, it is checked whether the "index A" exceeds the termination, and the processes of S504 and subsequent thereto are performed again using a new "index A" when the "index A" does not exceed the termination.

S506 and S509:
When data is present in the "position information" and data is not present in the "reference signal," the ladder program sorting unit 140 determines that the entry is a ladder circuit which should be preferentially executed. The ladder program sorting unit 140 adds the "position information" acquired from the "index A" to the entry indicated by the "index B" in the "execution priority table."

S510 to S511:

The ladder program sorting unit 140 increases the "number of nets processed" by one, and increases the "index B" in the "execution priority table" by one.

S512:

The ladder program sorting unit 140 searches for and deletes all the "reference signals" which refers to the "update signal" in the entry indicated by the "index A" in the "execution priority selection signal table" through a "reference signal deleting process" (to be described later).

S513:

The ladder program sorting unit 140 deletes the "position information" and the "update signal" in the entry indicated by the "index A" in the "execution priority selection signal table."

S514:

The ladder program sorting unit 140 increases the "index A" in the "execution priority selection signal table" by one.

S515:

When the "index A" does not exceed the termination, the ladder program sorting unit 140 performs the processes of S504 and subsequent thereto again using a new "index A." When the index A exceeds the termination of the "execution priority selection signal table," the process flow transitions to S516.

S507 to S508 and S514 to S515:

When data is present in the "position information" and data is present in the "reference signal," the ladder program sorting unit 140 increases the "number of nets unprocessed" by one and stores the "index A" in the "execution priority selection signal table" in the "unprocessed index." The "index A" in the "execution priority selection signal table" is increased by one. The processes are repeatedly performed until the "index A" exceeds the termination of the "execution priority selection signal table."

S516 to S517:

When the "index A" exceeds the termination of the "execution priority selection signal table," the "number of nets unprocessed" is other than 0, and the "number of nets processed" is equal to or greater than 0, the ladder program sorting unit 140 repeatedly performs the processes of S502 and subsequent thereto of setting the head entry position in the "index A" in the "execution priority selection signal table."

When the "index A" exceeds the termination of the "execution priority selection signal table," the "number of nets unprocessed" is other than 0, and the "number of nets processed" is 0, the ladder program sorting unit 140 acquires the "index A" in the "execution priority selection signal table" from the stored "unprocessed index," finds out the "index A" in which the number of "reference signals" in the entry indicated by the "index A" is the smallest, deletes the "reference signals," and repeatedly performs the processes of S502 and subsequent thereto setting the head entry position in the "index A" in the "execution priority selection signal table."

When the "index A" exceeds the termination of the "execution priority selection signal table" and the "number of nets unprocessed" is 0, the ladder program sorting unit 140 ends the process flow. Through the above-mentioned processes, the optimized execution priorities of ladder circuits are stored in the "position information" in the "execution priority table."

Figure 23A:
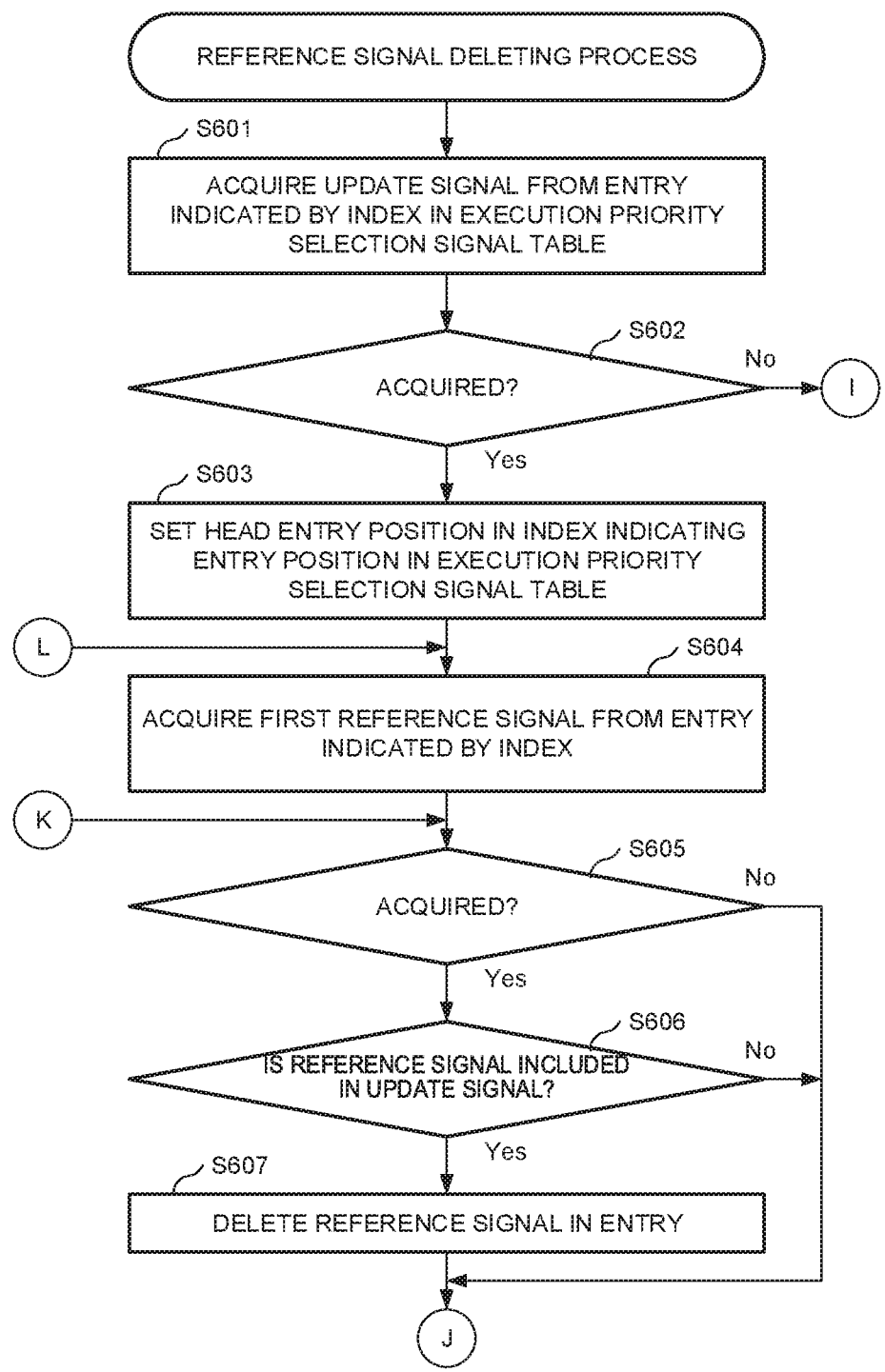
FIG. 23A is a diagram illustrating an example of a reference signal deleting process which is performed by the ladder program sorting unit.
Figure 23B:
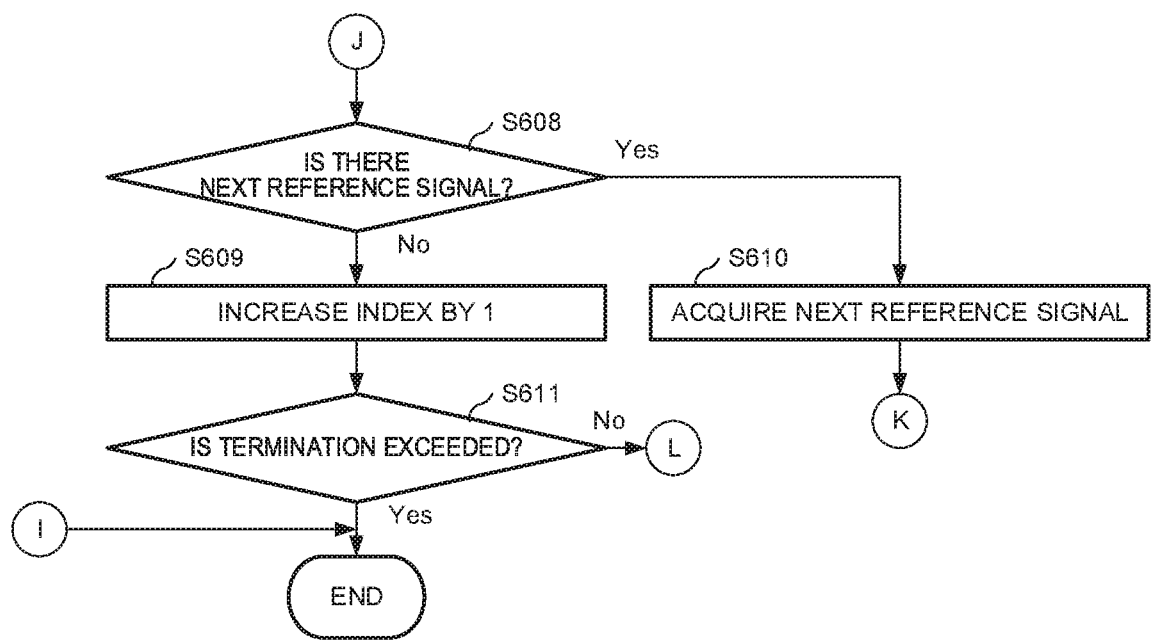
FIG. 23B is a diagram illustrating an example of the reference signal deleting process which is performed by the ladder program sorting unit.

FIGS. 23A and 23B are flowcharts illustrating a process of causing the ladder program sorting unit 140 to delete all the "reference signals" matching the "update signal" (the reference signal deleting process) using the "update signal" in the "execution priority selection signal table."

S601:

The ladder program sorting unit 140 acquires an "update signal" from the entry indicated by the "index" in the "execution priority selection signal table."

S602 to S603:

When the "update signal" is acquired, the ladder program sorting unit 140 sets the head entry position in the "index" indicating the entry position in the "execution priority selection signal table."

S604:

The ladder program sorting unit 140 acquires a "reference signal" from the "entry" indicated by the "index" in the "execution priority selection signal table."

S605 to S606:

When the "reference signal" is acquired in S604, the ladder program sorting unit 140 checks whether the "reference signal" is included in the "update signal."

S607:

When the "reference signal" is included in the "update signal," the ladder program sorting unit 140 deletes the "reference signal" in the entry indicated by the "index" in the "execution priority selection signal table."

S608 and S610:

When a next "reference signal" remains in the entry, the ladder program sorting unit 140 acquires the next "reference signal" and repeatedly performs the processes of S605 and subsequent thereto on the new "reference signal."

S609:

When a next "reference signal" is not present in the entry, the ladder program sorting unit 140 increases the "index" in the "execution priority selection signal table" by one.

S611:

When the "index" does not exceed the termination of the "execution priority selection signal table," the ladder program sorting unit 140 acquires a first "reference signal" from the entry indicated by the "index" in the "execution priority selection signal table" (S604) and repeatedly performs the processes of S605 and subsequent thereto.

When the "index" exceeds the termination of the "execution priority selection signal table," the ladder program sorting unit 140 ends the process flow.

According to this embodiment, the ladder program sorting unit 140 automatically sorts ladder circuits included in a ladder program in a predetermined range in an efficiently executable order on the basis of the execution priority signal table 120 prepared by the ladder program analyzing unit 110. Accordingly, a user does not have to manually correct the ladder circuits.

The present invention is not limited to the above-mentioned embodiments, but can be subjected to modifications such as substitution, omission, and addition of components and a change in order without departing from the gist of the present invention.

The invention claimed is:
1. A ladder program analyzing device, comprising:
a processor configured to
analyze a ladder program including a plurality of ladder circuits,
prepare an execution priority signal table in which execution priorities of the ladder circuits, reference signals indicating signals input to the ladder circuits, and update signals indicating signals output from the ladder circuits are correlated with each other, extract a first ladder circuit and a second ladder circuit from the execution priority signal table, the update signal of the second ladder circuit being the same as the reference signal of the first ladder circuit, and in response to a determination that the execution priority of the first ladder circuit is not higher than the execution priority of the second ladder circuit, cause a display to display the first ladder circuit as improvable in execution efficiency.

2. The ladder program analyzing device according to claim 1, wherein the processor is configured to cause the display to display the first ladder circuit as improvable in execution efficiency by changing at least a display format of the first ladder circuit.

3. The ladder program analyzing device according to claim 1, wherein the processor is configured to in response to a determination that the execution priority of the first ladder circuit is higher than the execution priority of the second ladder circuit, cause the display to display the first ladder circuit with a first color, and in response to the determination that the execution priority of the first ladder circuit is not higher than the execution priority of the second ladder circuit, cause the display to display the first ladder circuit with a second color different from the first color to indicate that the first ladder circuit is improvable in execution efficiency.

4. The ladder program analyzing device according to claim 1, wherein for each ladder circuit among the plurality of ladder circuits, the processor is configured to store, in the execution priority signal table, the execution priority of said each ladder circuit, the reference signal of said each ladder circuit, the update signal of said each ladder circuit, and position information of said each ladder circuit in the ladder program.

5. The ladder program analyzing device according to claim 4, wherein the processor is configured to extract, from the execution priority signal table, the first ladder circuit having the position information corresponding to a display position information of the display, extract, from the execution priority signal table, the second ladder circuit having the update signal being the same as the reference signal of the first ladder circuit, in response to a determination that the execution priority of the first ladder circuit is higher than the execution priority of the second ladder circuit, cause the display to display the first ladder circuit in a first format, and in response to the determination that the execution priority of the first ladder circuit is not higher than the execution priority of the second ladder circuit, cause the display to display the first ladder circuit in a second format different from the first format to indicate that the first ladder circuit is improvable in execution efficiency.

* * * * *